(12) United States Patent
Hamburgen et al.

(10) Patent No.: US 9,868,662 B2
(45) Date of Patent: Jan. 16, 2018

(54) CHOPPED-FIBERS WITH AXIAL PROPERTY GRADIENT FOR MOLDED PARTS

(71) Applicant: GOOGLE INC., Mountain View, CA (US)

(72) Inventors: William Hamburgen, Palo Alto, CA (US); Felix Jose Alvarez Rivera, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/398,150

(22) Filed: Jan. 4, 2017

(65) Prior Publication Data

US 2017/0113962 A1 Apr. 27, 2017

Related U.S. Application Data

(62) Division of application No. 13/841,444, filed on Mar. 15, 2013, now Pat. No. 9,550,881.

(51) Int. Cl.
*C03B 37/075* (2006.01)
*C03C 13/00* (2006.01)
(Continued)

(52) U.S. Cl.
CPC .......... *C03B 37/075* (2013.01); *C03B 37/025* (2013.01); *C03B 37/0253* (2013.01);
(Continued)

(58) Field of Classification Search
CPC ............ B32B 3/28; B32B 7/12; C03B 37/075
(Continued)

(56) References Cited

U.S. PATENT DOCUMENTS

| 4,574,108 A | 3/1986 | Fakirov et al. |
| 5,583,744 A | 12/1996 | Saito et al. |

(Continued)

FOREIGN PATENT DOCUMENTS

| JP | S6252139 A | 3/1987 |
| JP | 2002067070 A | 3/2002 |

(Continued)

OTHER PUBLICATIONS

Chernyak, et al., "The Optimal Diameter of Elementary Glass Fiber for Reinforcing Materials Used to Make Glass Plastics", Chernyak, et al., "The Optimal Diameter of Elementary Glass Fiber for Reinforcing Materials Used to Make Glass Plastics", All-Union Scientific Glass Fibers Research Institute, Translated from Steklo i. Keramika, vol. 22, No. 6, Jun. 1965, pp. 26-29, 2 pages.

(Continued)

*Primary Examiner* — Dion R Ferguson
*Assistant Examiner* — Mandeep S Buttar
(74) *Attorney, Agent, or Firm* — Brake Hughes Bellermann LLP (57) ABSTRACT

A portable computing device includes a processor, a memory, and a portable computing device case that encloses one or more integrated circuits, including at least the processor and the memory. The case includes a molded fiber-reinforced polymer (FRP) material that includes a polymer material and elongated fibers that adhere to the polymer material and that have a property that varies over a length of the fibers along an elongation axis of the fibers, wherein an adhesion strength between the fibers and the polymer is determined at least in part by a property of the fibers that varies over a length of the fibers along the elongation axis.

4 Claims, 6 Drawing Sheets

(51) Int. Cl.
  *C08K 7/14* (2006.01)
  *C03B 37/025* (2006.01)
  *C03B 37/16* (2006.01)

(52) U.S. Cl.
  CPC .............. *C03B 37/16* (2013.01); *C03C 13/00* (2013.01); *C08K 7/14* (2013.01); *C03B 2203/06* (2013.01); *C03B 2205/40* (2013.01)

(58) Field of Classification Search
  USPC ....... 361/679.34; 524/494, 495; 29/458, 459
  See application file for complete search history.

(56) References Cited

U.S. PATENT DOCUMENTS

| | | |
|---|---|---|
| 6,514,449 B1 | 2/2003 | Paulauskas et al. |
| 6,844,061 B2 | 1/2005 | Morita et al. |
| 7,390,593 B2 | 6/2008 | Yamamoto et al. |
| 2008/0075943 A1* | 3/2008 | Mortazavi .......... B29C 45/0005 428/297.4 |
| 2012/0156452 A1 | 6/2012 | Wilenski et al. |
| 2014/0268535 A1 | 9/2014 | Hamburgen et al. |

FOREIGN PATENT DOCUMENTS

| | | |
|---|---|---|
| JP | 2011001514 A | 1/2011 |
| WO | 2009082114 A1 | 7/2009 |
| WO | 2014150771 A1 | 9/2014 |

OTHER PUBLICATIONS

Office Action from EP14716137.6, dated Sep. 23, 2016, 5 pages.
International Search Report and Written Opinion from PCT/US2014/024188, dated Jul. 4, 2014, 12 pages.
Yao, et al., "The effects of fiber's surface roughness on the mechanical properties of fiber-reinforced polymer composites", SAGE,http:l/jcm.sagepub.com/content!early/2012/09/28/0021998312459871, Oct. 3, 2012, pp. 1-15.

* cited by examiner

CHOPPED-FIBERS WITH AXIAL PROPERTY GRADIENT FOR MOLDED PARTS

CROSS REFERENCE TO RELATED APPLICATIONS

This application is a divisional of, and claims priority to, U.S. application Ser. No. 13/841,444, filed Mar. 15, 2013, this disclosure of which is incorporated herein by reference.

TECHNICAL FIELD

This description relates to fiber reinforced polymers and, in particular, to chopped-fibers with an axial property gradient for use in molded parts.

BACKGROUND

Molded fiber reinforced plastics (FRPs), such as, for example, injection-molded FRP's, are increasingly used in a wide variety of products because of advantageous properties they possess with respect to competitive materials, such as, for example, their low-cost, low weight, strength and flexibility. However, injection-molded, fiber reinforced plastics can be quite brittle when compounded with high fiber loadings. The brittleness leads to poor energy absorption in overloads, such as, for example, drop tests. In addition, advantageous properties of the injection-molded, fiber reinforced plastics often must be traded off against each other when selecting a material for a particular use. For example, FRPs having a high density of fibers in the material may be relatively strong but also relatively brittle, while FRP's having a low density of fibers in the material may be relatively weak but also may have a relatively high ductility.

Accordingly, there exists a need for materials and products to address the shortfalls of present technology and to provide other new and innovative features.

SUMMARY

In a first general aspect, a portable computing device includes a processor, a memory, and a portable computing device case that encloses one or more integrated circuits, including at least the processor and the memory. The case includes a molded fiber-reinforced polymer (FRP) material that includes a polymer material and elongated fibers that adhere to the polymer material and that have a property that varies over a length of the fibers along an elongation axis of the fibers, wherein an adhesion strength between the fibers and the polymer is determined at least in part by a property of the fibers that varies over a length of the fibers along the elongation axis.

Implementations can include one or more of the following features. For example, the portable computing device can be any one of a laptop computer, a hand held computer, a tablet computer, a net book computer, a personal digital assistant, an enterprise digital assistant, a smart phone, or a wearable computer.

The elongated fibers can include glass fibers. The elongated fibers can include carbon fibers. The fibers can be cylindrically-shaped, and the property of the fibers that varies over the length of the fibers includes a diameter of the fibers. The fibers have a smaller diameter than a central portion of the fibers. Fibers in the case can have minimum diameters at the ends of the fibers of 5 µm-10 µm and can have maximum diameters in a central portion of the fiber of 10 µm-20 µm. The adhesion strength between the fibers and the polymer can be stronger at the central portion of the fibers than at the ends of the fibers. The property of the fibers that varies over the length of the fibers includes a surface roughness of the fibers.

In another general aspect, a fiber-reinforced polymer (FRP) material includes a polymer material and elongated fibers that adhere to the polymer material and that have a property that varies over a length of the fibers along an elongation axis of the fibers. An adhesion strength between the fibers and the polymer is determined at least in part by the property of the fibers that varies over a length of the fibers along the elongation axis.

Implementations can include one or more of the following features. For example, the elongated fibers can include glass fibers. The elongated fibers can include carbon fibers. The fibers can be cylindrically-shaped, and the property of the fibers that varies over the length of the fibers can include a diameter of the fibers. The ends of the fibers can have a smaller diameter than a central portion of the fibers. The fibers can have minimum diameters at the ends of the fibers of 5 µm-10 µm and have maximum diameters in a central portion of the fiber of 10 µm-20 µm. The adhesion strength between the fibers and the polymer can be stronger at the central portion of the fibers than at the ends of the fibers. The property of the fibers that varies over the length of the fibers can include a surface roughness of the fibers.

In another general aspect, a method of making glass fibers for use in an molded, fiber-reinforced polymer material includes drawing a fiber from a glass preform and vibrating the drawn fiber as it is being drawn. A frequency and/or amplitude of the vibration can be varied, where the diameter of the drawn fiber is determined at least in part by the amplitude and/or frequency of the vibration. The drawn fiber can be cut into subsections, where the subsections have a diameter that varies over a length along an elongation axis of the subsections.

Implementations can include one or more of the following features. For example, the subsections can have a diameter at the ends of the subsections that is smaller than the diameter at the middle of the subsections. Vibrating the drawn fiber as it is being drawn can include vibrating the fiber at a first frequency and add a second frequency, and varying a frequency of the vibration can include varying the frequency and/or amplitude of the first vibration frequency and varying the frequency and/or amplitude of the second vibration frequency.

The method can further include locally pitting a surface of the drawn fiber and varying the amplitude and/or frequency of the pitting along the length of the fiber.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

In accordance with materials, apparatuses, and methods described herein, fiber-reinforced polymer materials can have improved strength and ductility properties due to the use of elongated fibers that have a gradient of adhesion strength between the fibers and the surrounding polymer matrix along a longitudinal axis of the fibers, where the adhesion is higher near the center of the fibers length, and the adhesion is lower at the end of the fibers. When such fibers are used in fiber-reinforced polymer parts, and the part is subjected to an overload, rather than simply fracturing the fibers, the interface between the fibers and the polymer matrix may fail progressively from the ends of the fibers towards the centers of the fibers. After the overload, the part may return to close to its original shape, although perhaps with some degradation of the apparent modulus of the part. In this manner, the part may be able to absorb some energy, without completely failing.

A fiber-reinforced polymer part made from such materials may have relatively higher ductility for a given strength than a similar part made with fibers that do not have a gradient of adhesion strength between the fibers and the surrounding polymer matrix along a longitudinal axis of the fibers. Similarly, a fiber-reinforced polymer part made from such materials may have a relatively higher strength for a given ductility than a similar part made from a material having fibers that do not have a gradient of adhesion strength between the fibers and the surrounding polymer matrix along a longitudinal axis of the fibers.

Figure 1:
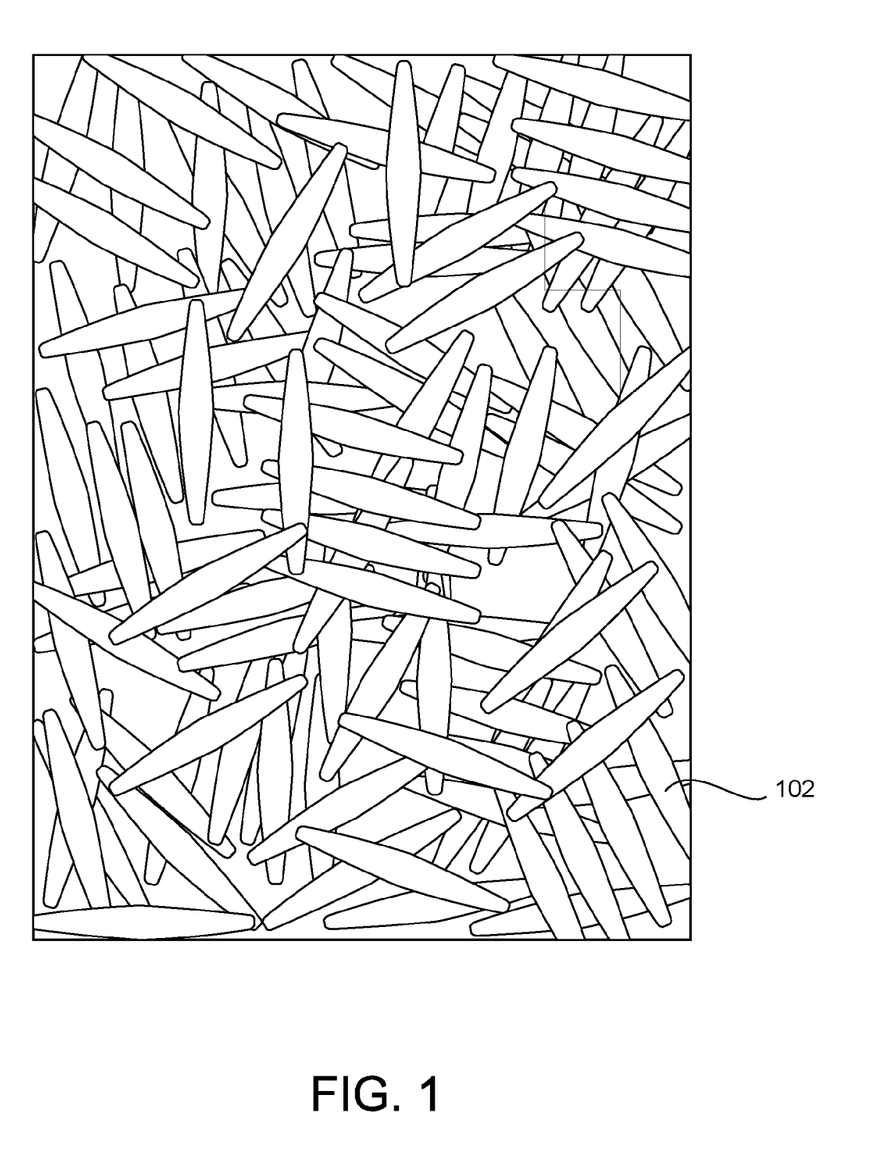
FIG. 1 is a plan view of an example molding material that includes elongated fibers and polymer material.

FIG. 1 is a plan view of an example molding material that includes elongated fibers 102 and polymer material. The molding material includes a large number of elongated fibers mixed with a polymer material to which the elongated fibers adhere. The elongated fibers each have an axial direction, and the axial directions of the different fibers can be randomly oriented or can be biased in one or more particular directions. A molding material can exist in a liquid or flowable state in which it can be formed into a desired shape. For example, when in the liquid or flowable state the molding material can be molded into a desired shape by placing the material into a mold of the desired shape. In one implementation, an injection molding process can be used to form the material into the desired shape. Once the material is formed into a desired shape, the material can be cured or set into a solid or non-flowable state. A variety of different polymer materials may be used in a polymer matrix, for example, vinyl ester, polyurethane cast elastomers, polypropylene, epoxy resin, thermosetting polyurethane, unsaturated polyurethane resin, polyamide, polycarbonate, polyester, polyacetal, polyethylene esther, polystyrene, and/or combinations of the above-mentioned materials In the cured or unflowable state, the elongated fibers of the molding material adhere to the polymer material that surrounds the molding material, and the strength of the adhesion between the fibers and the polymer material can be non-uniform over the length of the fibers. For example, a gradient can exist in the strength of the adhesion between the fibers in the polymer material along a longitudinal axis of the fibers. For example, the adhesion between the fibers and the polymer material can be weakest at the ends of the fibers and can be strongest near a central portion of the fibers.

Figure 2:
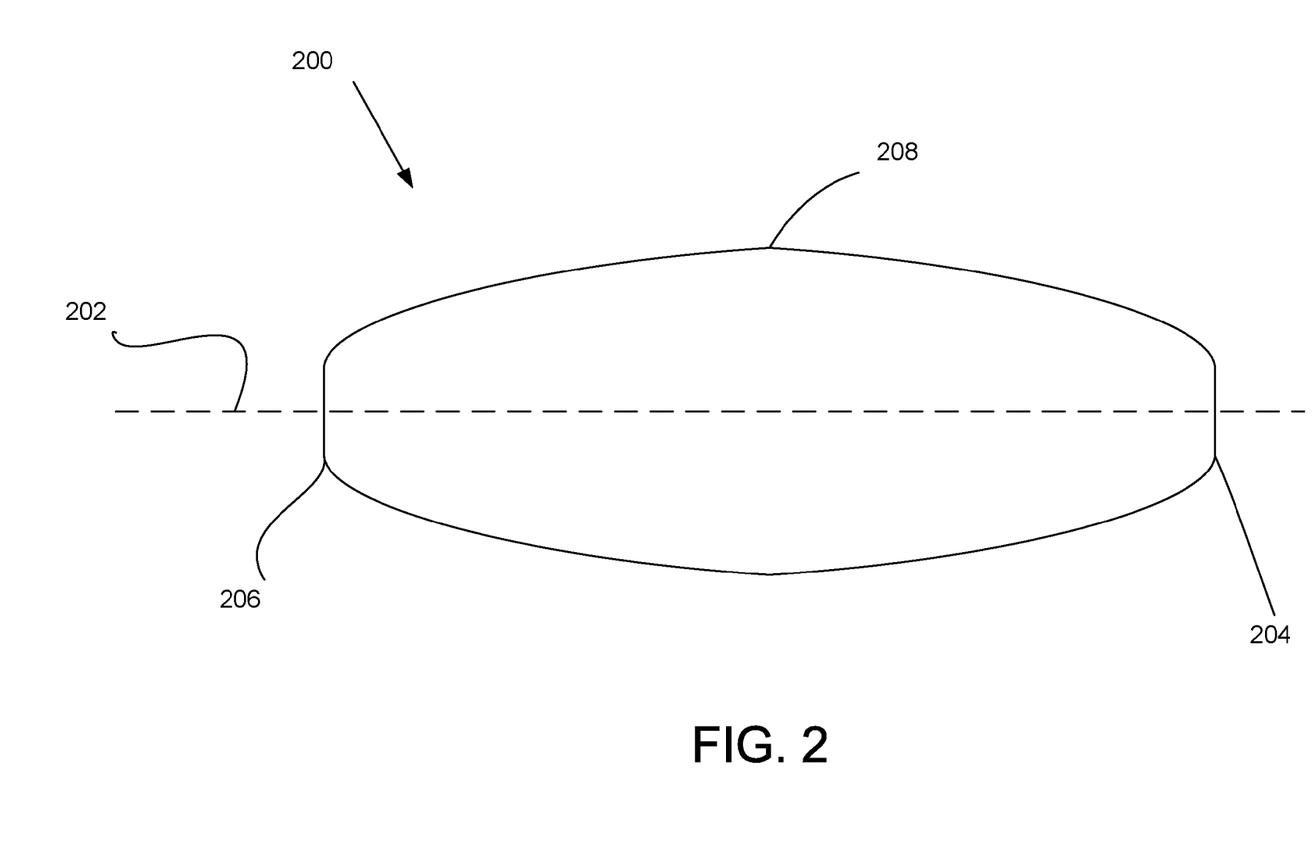
FIG. 2 is a cross-sectional diagram of an example elongated fiber that can be used in a molding material.

FIG. 2 is a cross-sectional diagram of an example elongated fiber 200 that can be used in a molding material. The fiber 200 is elongated along an elongation axis 202 between a first end 204 and a second and 206. A middle section of the fiber 208 is located between the first end and then the second end. The fiber can have a generally cylindrical shape, although the cylindrical shape need not be that of a right cylinder in which the cylinder has a constant diameter along its axis. Instead, the diameter of the middle section 208 can be greater than the diameters at the ends 204, 206. Because of the gradient in the diameter of the fiber along the length of the fiber, the strength of the adhesion of the polymer material to the fiber also can have a gradient along the length of the fiber. In particular, the differential adhesion per unit length at any point along the length of the fiber may vary according to $\pi d \cdot dx$, where d is the local diameter of the fiber, and dx is the differential length along the fiber. Therefore, the adhesion of the polymer material to the fiber can vary according to the diameter, d.

In particular implementations, the diameters of the fibers 200 can be about 3 µm-25 µm. In some implementations, the ends of the fibers 202, 206 can have diameters of about 5 µm-10 µm, and the maximum diameter of the fibers 200 in a central portion 208 of the fiber can be about 10 µm-20 µm. In particular implementations, the fibers 200 can have lengths of approximately 100 µm-500 µm. The fibers can be made from a variety of materials. For example, in some implementations, the fibers can be glass fibers, and in other implementations the fibers can be carbon fibers.

Figure 3:
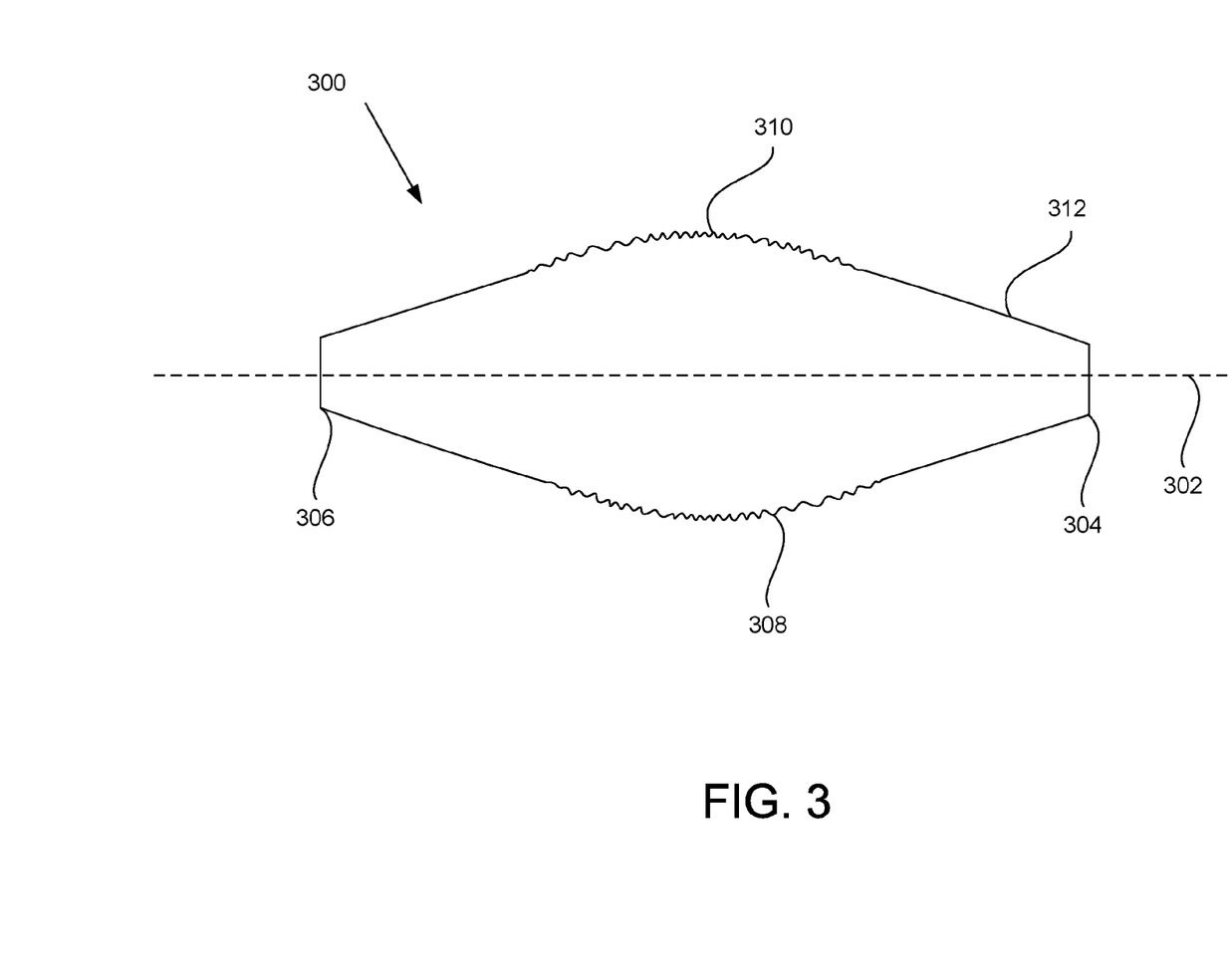
FIG. 3 is a cross-sectional diagram of another example elongated fiber that can be used in a molding material.

FIG. 3 is a cross-sectional diagram of another example elongated fiber 300 that can be used in an molding material. Like the elongated fiber 200 shown in FIG. 2, the fiber 300 has a diameter that varies over the length of the fiber, and the ends 304, 306 have a diameter that is smaller than the diameter of the middle section 308. In addition, the surface of the fiber can have a local microstructure that varies along the length of the fiber. For example, the surface of the fiber 310 in the middle section the fiber can be locally rougher or more pitted than that the surface 312 at the end of the fiber. This gradient in the surface property of the fiber 300 can lead to an additional change in the adhesion of the fiber to the polymer material, such that the adhesion is greater in the central portion 308 of the fiber than at the ends 304, 306 of the fiber.

Figure 4:
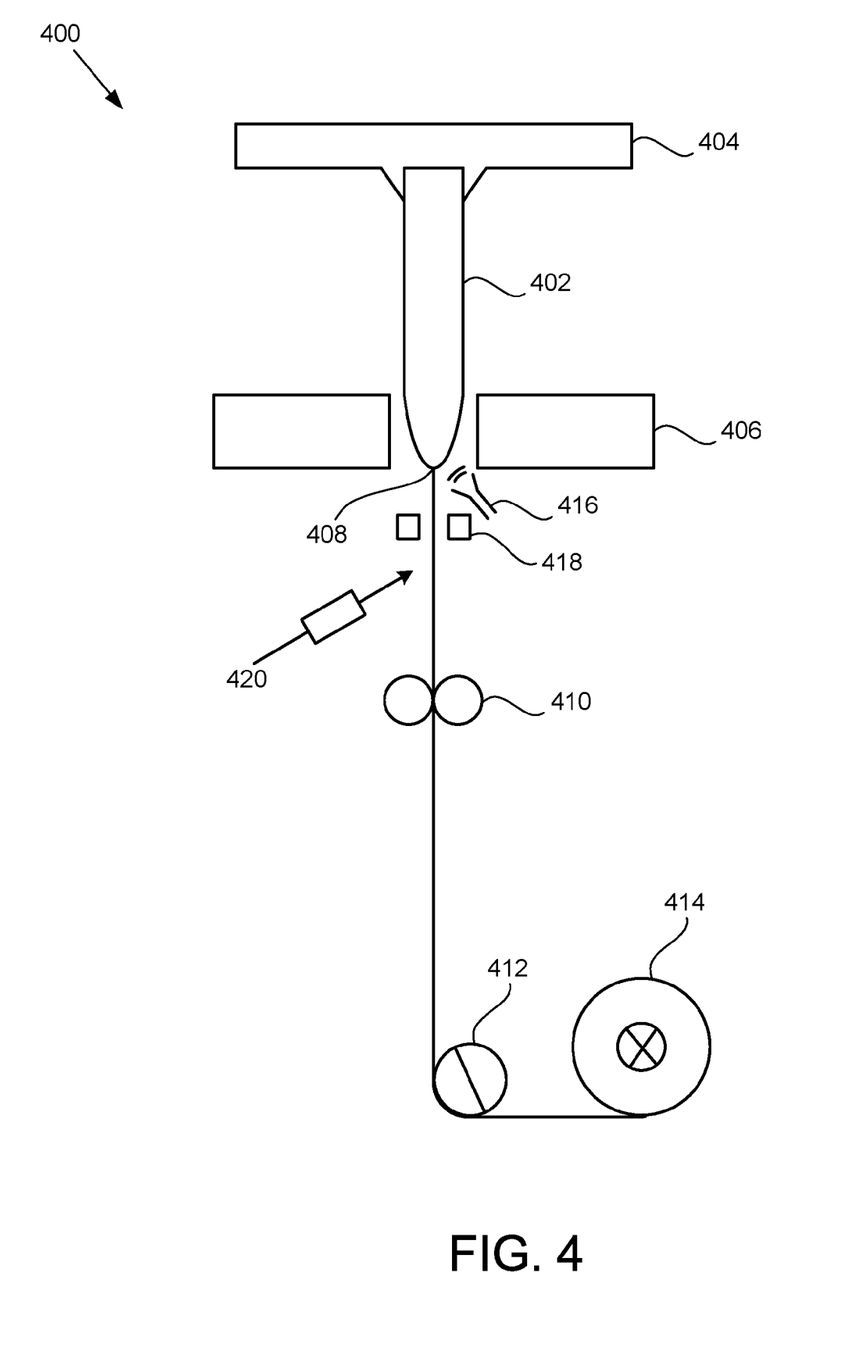
FIG. 4 is a schematic diagram of an example apparatus for producing elongated fibers for use in an molding material.

FIG. 4 is a schematic diagram of an example apparatus 400 for producing elongated fibers for use in an molding material. In general, a glass preform 402 can be supported by a movable preform holder 404. The preform 402 can be heated at one end by a furnace 406, so that an end 408 of the preform melts and the sinks due to gravity. The melted portion of the glass preform can be pulled by a tractor system 410, 412. In one implementation, the tractor system can include one or more rollers that pull the glass fiber. Finally, the glass fiber is rolled onto a spool 414.

The general diameter of the final glass fiber can be controlled by tuning such parameters as the temperature of the preform tip 408, the rate at which the preform 402 is fed into the furnace 406, and the speed at which the fiber is pulled by the tractor system 410, 412.

In addition, the local diameter of the drawn optical fiber may be controlled in a variety of ways. For example, the local diameter of the drawn fiber may be controlled by deliberately introducing a controllable vibration into the apparatus 400. In some implementations, the preform holder 404 may be vibrated at a frequency that resonates with the vibration of the preform tip 408. Of course, because the length of the preform 402 changes, the vibration frequency of the preform holder 404 would change as the length of the preform changes to maintain the resonance condition with the preform tip 408. In some implementations, mechanical components of the tractor system 410, 412 may be vibrated to impart vibrations to the preform tip 408 to affect the diameter of the drawn fiber. In other implementations, acoustic vibrations can be imparted to the preform tip 408, for example, by a loudspeaker 416 that produces acoustic vibrations in the environment you're the preform tip 408. The local diameter of the fiber can be controlled through control of the amplitude and/or the frequency of the vibration.

Figure 5:
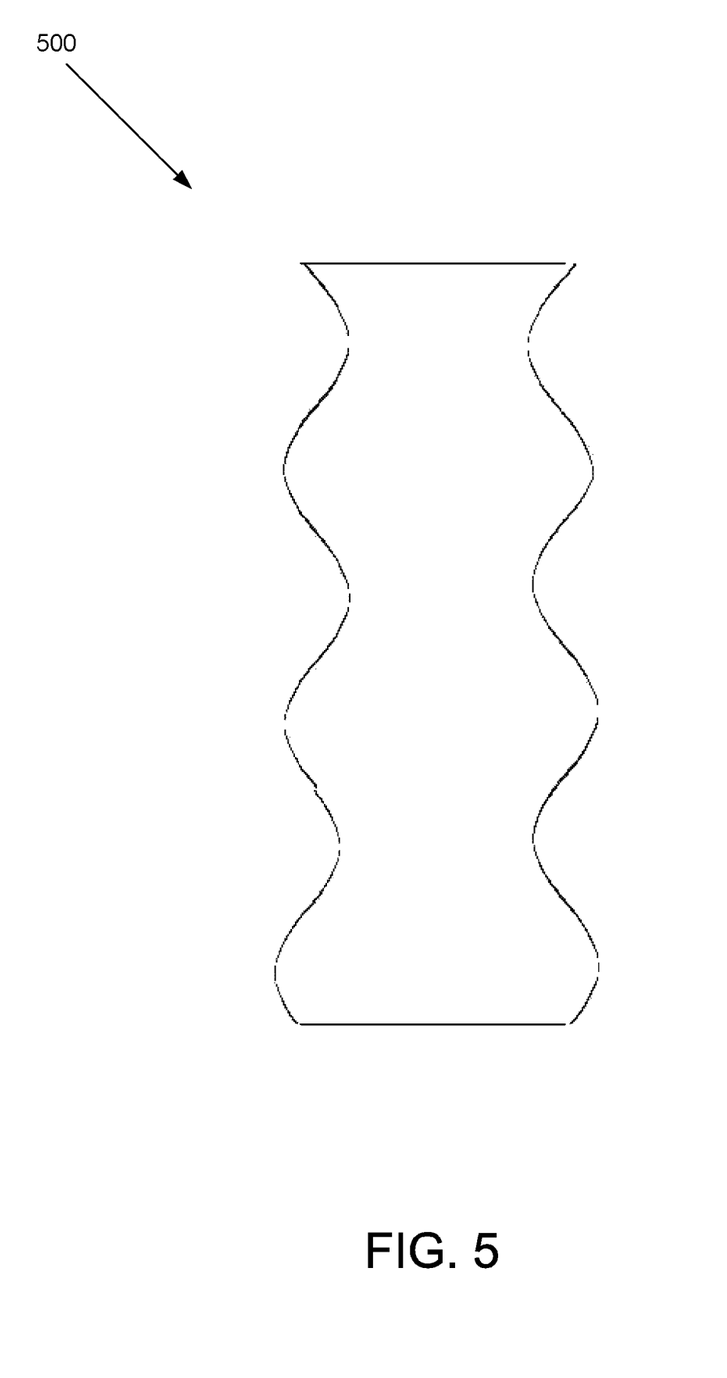
FIG. 5 a schematic diagram of an example apparatus for producing elongated fibers for use in a molding material.

FIG. 5 a schematic diagram of drawn fiber 500 having a variable diameter. As shown in FIG. 5, the drawn fiber 500 can have a periodic pattern of minimum and maximum diameters along its length. The distance between minimum and/or maximum diameters of the drawn fiber can be relatively constant, so that when the drawn fiber is cut into subsections, e.g., at the minimum diameter locations of the drawn fiber, the length of a sample of multiple subsections can have a relatively low standard deviation.

In some implementations, more than one vibration can be imparted to the fiber as it is being drawn in order to create more than one diameter variation in the drawn fiber. For example, a first vibration may impart a first diameter variation having a first length scale along the fiber, and a second vibration may impart a second diameter variation having a second length scale along the fiber. In some implementations, different vibration frequencies and/or different vibration amplitudes may be used to produce the different diameter variations in the drawn fiber.

As explained herein, for example, with respect to FIG. 3, a drawn fiber can be created having a surface variation over the length of the fiber. For example, the variation in the surface texture 310, 312 can be created while the fiber is drawn by introducing an appropriate vibration variation to the fiber as it is being drawn. In another implementation, referring again to FIG. 4, the drawn fiber can be passed through a plasma 418 that can be controlled to vary a surface roughness of the fiber. The plasma can be either within the furnace 406 or external to the furnace. In another implementation, a laser 420 can focus a radiation beam onto the drawn fiber, and the radiation beam can be controlled to alter the fiber diameter and/or surface roughness of the fiber. The radiation beam can be imparted to the fiber either within the furnace 406 or outside of the furnace.

After the fiber 500 has been drawn, the fiber can be cut or broken into similar subsections that each have a similar length and variation of a property along their axial direction, which affects the adhesion of the subsections to the polymer matrix in the molding material. The fiber 500 can be by subjected to a mechanical stress, which may cause the fiber to break or be cut at the minimum diameter positions along the fiber. After the fiber has been broken into subsections, the subsections can be mixed with a polymer matrix material, and then the mixture can be used as a material to form molded parts. The material can be molded into parts using a variety of folding processes. For example, bladder molding, pultrusion, compression molding and injection molding can be used to form parts.

Figure 6:
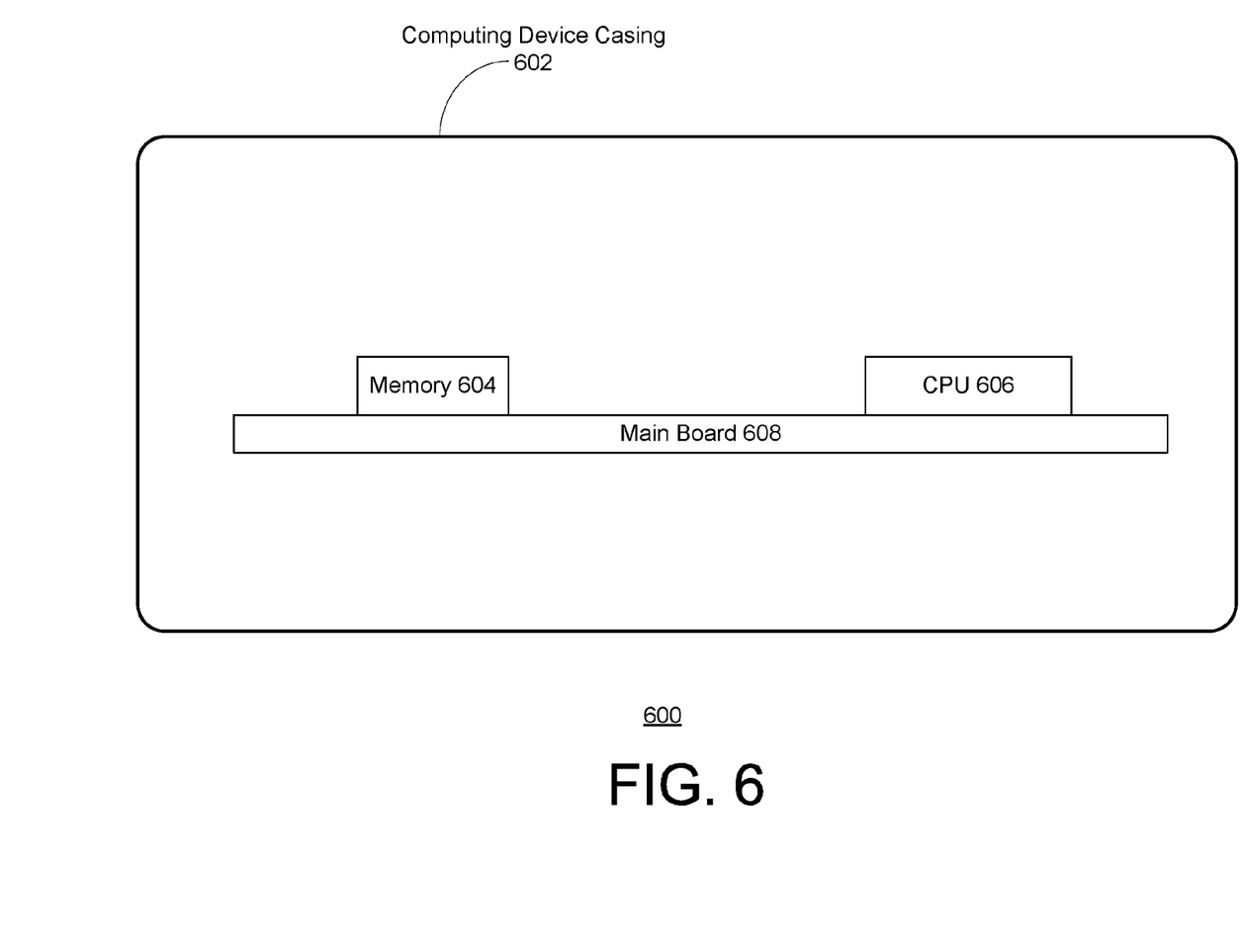
FIG. 6 is a schematic diagram of an example portable computing device that includes a molded case.

FIG. 6 is a schematic diagram of an example portable computing device 600 that includes a molded case 602. The portable computing device 600 can include a plurality of integrated circuits (e.g., a central processing unit 606A, memory 604, etc.) mounted on a mainboard 608, which is disposed inside the computing device case 602. The computing device case can be formed of a molding material that includes elongated fibers that adhere to a polymer matrix material and that have a property that varies over a length of the fibers, where an adhesion strength between the fibers and the polymer matrix material is determined at least in part by the variable property. The portable computing device 600 can be, for example, a laptop computer, a hand held computer, a tablet computer, a netbook computer, a mobile phone, or a wearable computer a personal digital assistant, or an enterprise digital assistant.

A number of implementations have been described. Nevertheless, it will be understood that various modifications may be made without departing from the spirit and scope of the invention. Accordingly, other implementations are within the scope of the following claims.

What is claimed is:

1. A method of making glass fibers for use in a molded, fiber-reinforced polymer material, the method comprising:
   drawing a fiber from a glass preform;
   vibrating the drawn fiber as it is being drawn;
   varying a frequency and/or amplitude of the vibration, wherein the diameter of the drawn fiber is determined at least in part by the amplitude and/or frequency of the vibration;
   cutting the drawn fiber into subsections, wherein the subsections have a diameter that varies over a length along an elongation axis of the subsections.

2. The method of claim 1, wherein the subsections have a diameter at the ends of the subsections that is smaller than the diameter at the middle of the subsections.

3. The method of claim 1,
   wherein the vibrating the drawn fiber as it is being drawn includes vibrating the fiber at a first frequency and add a second frequency, and
   wherein varying a frequency of the vibration includes varying the frequency and/or amplitude of the first vibration frequency and varying the frequency and/or amplitude of the second vibration frequency.

4. The method of claim 1, further comprising
   locally pitting a surface of the drawn fiber and varying the amplitude and/or frequency of the pitting along the length of the fiber.

* * * * *